United States Patent
Tseng et al.

(10) Patent No.: US 8,868,911 B2
(45) Date of Patent: Oct. 21, 2014

(54) METHOD FOR KEY GENERATION, MEMBER AUTHENTICATION, AND COMMUNICATION SECURITY IN DYNAMIC GROUP

(75) Inventors: Chien-Chao Tseng, Hsinchu (TW); Tzu-Hsin Ho, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 332 days.

(21) Appl. No.: 13/472,017

(22) Filed: May 15, 2012

(65) Prior Publication Data

US 2012/0331295 A1    Dec. 27, 2012

(30) Foreign Application Priority Data

Jun. 21, 2011    (TW) .............................. 100121624 A

(51) Int. Cl.
*H04L 9/32* (2006.01)
*H04L 9/30* (2006.01)

(52) U.S. Cl.
CPC ................ *H04L 9/3066* (2013.01); *H04L 9/32* (2013.01); *H04L 9/3255* (2013.01); *H04L 9/3093* (2013.01)
USPC ........... 713/170; 713/150; 713/161; 713/168; 713/169; 713/182; 380/28; 380/44; 380/46; 726/3; 726/4

(58) Field of Classification Search
CPC ....... H04L 9/3093; H04L 9/3255; H04L 9/32; H04L 9/3244
USPC .......... 713/150, 161, 168–170, 182; 726/3–4; 380/28, 44, 46
See application file for complete search history.

(56) References Cited

U.S. PATENT DOCUMENTS

| | | | |
|---|---|---|---|
| 7,017,181 B2 | 3/2006 | Spies et al. | |
| 7,103,911 B2 | 9/2006 | Spies et al. | |
| 7,523,314 B2 | 4/2009 | Spies et al. | |
| 7,580,521 B1 | 8/2009 | Spies et al. | |
| 7,634,085 B1 | 12/2009 | Sahai et al. | |
| 7,765,582 B2 | 7/2010 | Spies et al. | |
| 8,713,311 B1* | 4/2014 | Roskind | 713/161 |
| 2006/0050671 A1* | 3/2006 | Kim | 370/338 |
| 2008/0260147 A1* | 10/2008 | Shin et al. | 380/46 |
| 2012/0254609 A1* | 10/2012 | Hofstadter et al. | 713/153 |

OTHER PUBLICATIONS

Amit Sahai et al., Fuzzy Identity-Based Encryption, Eurocrypt LNCS, 2005, pp. 457-473, vol. 3494, Springer Verlag.

(Continued)

*Primary Examiner* — Andrew Nalven
*Assistant Examiner* — Amir Mehrmanesh
(74) *Attorney, Agent, or Firm* — Muncy, Geissler, Olds & Lowe, P.C.

(57) ABSTRACT

The present invention provides a method for keys generation, member authentication and communication security in a dynamic group, which comprises steps: assigning each member an identification vector containing common group identification vector elements and an individual identification vector element, and generating an authentication vector and an access control vector for each member according to the identification vector; using the identification vector elements to generate public key elements and establish an authentication public key and an access control public key; and using a polynomial and the identification vector to generate a private key. The present invention uses these public keys and private keys, which are generated from the identification vectors, to implement serverless member authentication and data access control, whereby is protected privacy of members and promoted security of communication.

7 Claims, 3 Drawing Sheets

(56) References Cited

OTHER PUBLICATIONS

Vipul Goyal et al, Attribute-based encryption for fine-grained access control of encrypted data, ACM Conference on Computer and Communication Security, 2006, pp. 1-28.

John Bethencourt et al., Ciphertext-Policy Attribute-Based Encryption, IEEE Symposium on Security and Privacy(SP07), 2007, 14 pages.

Dan Boneh et al., Identity-Based Encryption from the Weil Pairing, Advance in Cryptology-Crypto, 2001, pp. 213-229, vol. 2139, Lecture Notes in Computer Science, Springer-Verlag.

Adi Shamir, Identity-Based Cryptosystems and Signiture Schemes, Advance in Cryptology-Crypto 84, 1985, pp. 47-53,vol. 196, Springer-Verlag.

* cited by examiner

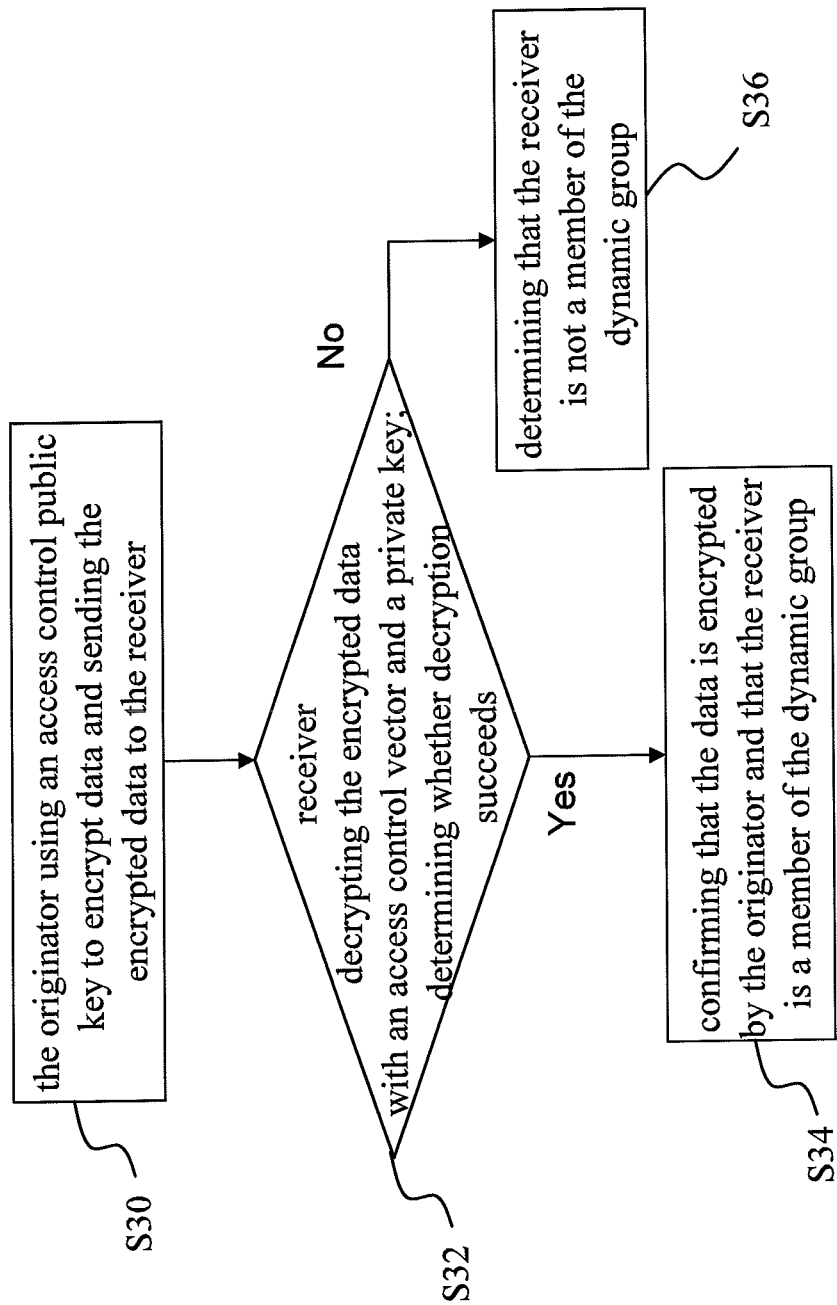

METHOD FOR KEY GENERATION, MEMBER AUTHENTICATION, AND COMMUNICATION SECURITY IN DYNAMIC GROUP

BACKGROUND OF THE INVENTION

1. Field of the Invention

The present invention relates to a security mechanism for network communication, particularly to a method for key generation, member authentication and communication security in a dynamic group.

2. Description of the Related Art

The current cryptography systems may be categorized into the symmetric cryptography systems and the asymmetric cryptography systems. In the symmetric cryptography systems, the sender and receiver share the same key, and both parties use the same key to encrypt and decrypt the message. DES (Data Encryption Standard) is a symmetric cryptography system widely used in the early stage, but AES (Advanced Encryption Standard) has replaced DES now. The symmetric cryptography systems have the advantage of high speed. Further, the symmetric cryptography systems are hard to break if the key is long enough. However, the security of key administration may become a problem for the symmetric cryptography systems since many persons have the same key. In such a case, the symmetric cryptography systems need a complicated key administration system, and the keys should be updated periodically.

In the asymmetric cryptography systems, each user has a pair of keys, including a public key and a private key. The sender encrypts data with the public key, and the receiver decrypts data with the private key. The public key is widely issued to all the users. However, the private key is kept secretly. The asymmetric cryptography systems can provide privacy, authentication and undeniability at the same time and have a simpler key administration system. Each user only needs to keep his own private key no matter how many users are involved in the system. R. Rivest, A. Shamir and L. Adleman proposed an RSA public key cryptosystem, which is an asymmetric cryptography algorithm based on the difficulty of factoring a composite number into two large prime numbers. Among the public key cryptographies, the RSA public key cryptosystem is the most famous and widely-used. The Elliptic Curve Cryptography (ECC) is a new public-key cryptography algorithm based on the intractability of finding the discrete logarithm. As there is none algorithm able to find the discrete logarithm within an appropriate interval of time, the ECC-based cryptography is much securer than the RSA-based cryptography. Besides, the ECC-based cryptography can use a key of only 160 bits to achieve the same level of security afforded by the RSA-based cryptography using a key of 1024 bits. Therefore, the ECC-based cryptography is very suitable for the applications in a limited-resource environment, such as a smart card.

However, the asymmetric cryptography has the following disadvantages: complicated computation deceases encryption/decryption speed; the validity of a public key must be verified before using it; the data encrypted by a public key cannot be decrypted by the private keys of all the members but can only be decrypted by the private key of a single member; the public key of the opposite party must be verified before membership confirmation; the conventional asymmetric cryptosystems (such as RSA and ECC) are unlikely to protect privacy of members.

Accordingly, the present invention proposes a method for key generation, member authentication and communication security in a dynamic group to overcome the abovementioned problems. The principles and embodiments are to be described in detail below.

SUMMARY OF THE INVENTION

The primary objective of the present invention is to provide a method to generate keys for a dynamic group, wherein only the originator of the group has an access control public key, and wherein the other members of the group share an authentication public key and respectively have their own private keys, whereby the keys are exempted from being copied, and whereby the originator can vary the individual identification part of the access control public key to control the access right of a member when the member joins or leaves the group.

Another objective of the present invention is to provide a method for member authentication in a dynamic group, wherein all the members use a common authentication public key to encrypt an authentication message, and wherein each member uses his own unique private key to decrypt the encrypted authentication message without any third party interposing therebetween, whereby two members can authenticate each other serverlessly lest information be manipulated or defrauded.

Still another objective of the present invention is to provide a method for communication security in a dynamic group, wherein the members can verify whether data comes from the originator lest data be altered.

A further objective of the present invention is to provide a method for communication security in a dynamic group, wherein the originator uses the access control public key generated with the identification vectors of the members of the group to encrypt data, whereby only the members of the group can decrypt and access the data.

To achieve the abovementioned objectives, the present invention proposes a key generation method for a dynamic group having an originator and a plurality of members. The key generation method of the present invention comprises steps: assigning each member an identification vector including d pieces of common group identification vector elements and a unique individual identification vector element, and forming an authentication vector and an access control vector according to the identification vector for each member; a server or the originator using the group identification vector elements, the individual identification vector element, and a corresponding function to generate group public key elements and individual public key elements and form an authentication public key and an access control public key; the server or originator generating an arbitrary $(d-1)$-degree polynomial for each member, and using the polynomial and the identification vector to generate a private key.

The present invention also proposes a member authentication method for a dynamic group, whereby a first member authenticates a second member. The member authentication method of the present invention comprises Step (a): a first member encrypting a first authentication message into an encrypted first authentication message and sending the encrypted first authentication message to a second member; Step (b): the second member decrypting the encrypted first authentication message into a once-decrypted first authentication message, generating a second authentication message, encrypting the once-decrypted first authentication message and the second authentication message into an encrypted once-decrypted first authentication message and an encrypted second authentication message, and sending the encrypted once-decrypted first authentication message and the encrypted second authentication message to the first member;

Step (c): the first member decrypting the encrypted once-decrypted first authentication message and the encrypted second authentication message into a twice-decrypted first authentication message and a once-decrypted second authentication message, and comparing the twice-decrypted first authentication message with the first authentication message, wherein if the twice-decrypted first authentication message is different from the first authentication message, authentication fails, and wherein if the twice-decrypted first authentication message is identical to the first verification message, the first member encrypts the once-decrypted second authentication message into an encrypted once-decrypted second authentication message and sends the encrypted once-decrypted second authentication message to the second member; and Step (d): the second member decrypting the encrypted once-decrypted second authentication message to obtain a twice-decrypted second authentication message, and comparing the twice-decrypted second authentication message with the second authentication message, wherein if the twice-decrypted second authentication message is different from the second authentication message, authentication fails, and wherein if the twice-decrypted second authentication message is identical to the second authentication message, authentication succeeds.

The present invention also proposes communication security method for a dynamic group, whereby the originator can sends data to a receiver (a member of the dynamic group) securely. The communication security method of the present invention comprises steps: the originator using an access control public key to encrypt data and sending the encrypted data to the receiver; the receiver receiving the encrypted data and decrypting the encrypted data with an access control vector and a private key; if the individual identification vector element of the receiver's access control vector is one of the individual identification vector elements that the access control public key is based on, the receiver succeeding in decrypting the encrypted data; if the individual identification vector element of the receiver's access control vector is not one of the individual identification vector elements that the access control public key is based on, the receiver failing in decrypting the encrypted data, and the receiver not belonging to the dynamic group.

Below, the embodiments are described in detail to make easily understood the objectives, technical contents, characteristics and accomplishments of the present invention.

BRIEF DESCRIPTION OF THE DRAWINGS

FIG. 3 shows a flowchart of a communication security method for a dynamic group according to one embodiment of the present invention.

DETAILED DESCRIPTION OF THE INVENTION

The present invention provides a method for key generation, member authentication and communication security in a dynamic group, which generates one-to-many keys, wherein a common public key encrypts data, and wherein the encrypted data can be decrypted by the private keys of the qualified members, and wherein the mutual authentication between members is not via a server but via the common authentication public key and the individual private keys of the members.

When an originator establishes a dynamic group and invites a plurality of members to join the group, he generates keys for all the members and transmits the keys to all the members via a secure channel. Thereby, the members can use the keys to transmit data securely. In the present invention, all the computation of key generation and encryption/decryption is based on a cyclic dynamic group having a group generator.

Figure 1:
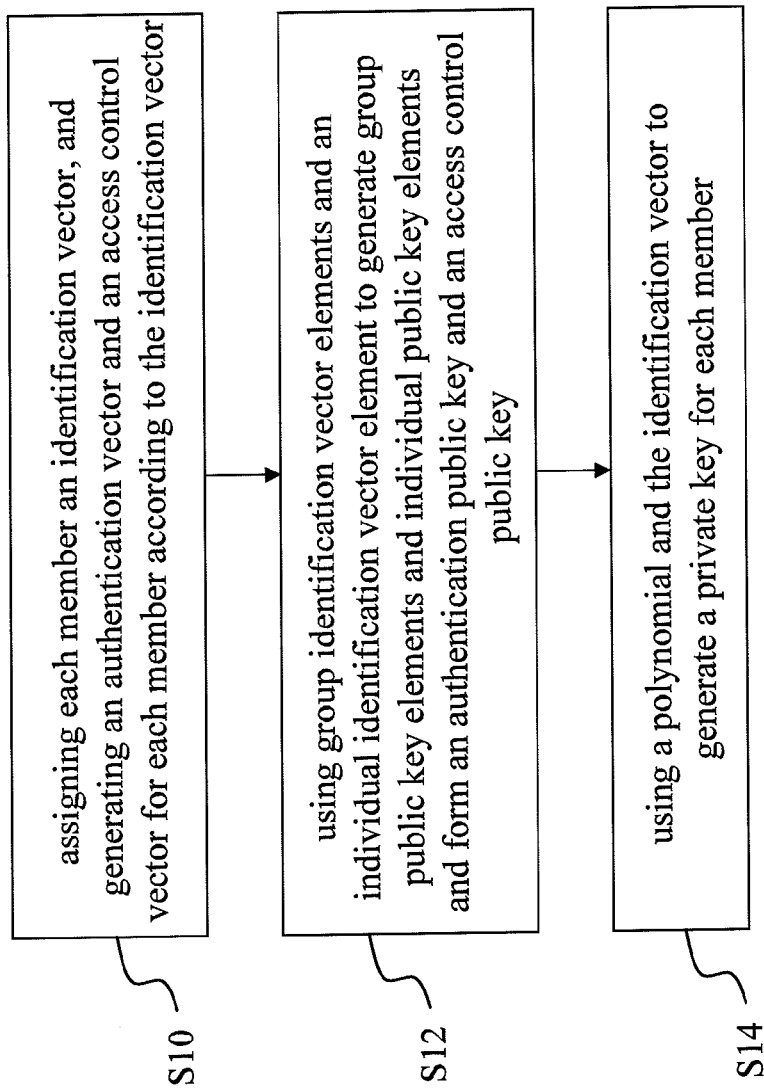
FIG. 1 shows a flowchart of a key generation method for a dynamic group according to one embodiment of the present invention.

Refer to FIG. 1 showing a flowchart of a key generation method according to one embodiment of the present invention. In Step S10, respectively assign identification vectors $V^{Peer}$ to all the members. Each identification vectors $V^{Peer}$ has d pieces of group identification vector elements $v_{Gr\text{-}1}$, $v_{Gr\text{-}2}, \ldots, v_{Gr\text{-}d}$ and a unique individual identification element $v_{Idv}$. The identification vector of a first member is expressed as $$V^{Peer1} = \{v_{Gr\text{-}1}, v_{Gr\text{-}2}, \ldots, v_{Gr\text{-}d}, v_{Idv1}\} \quad (1)$$

Each member has an authentication vector $V_{Au}$ and an access control vector $V_{Ac}$ according to the identification vector thereof. The authentication vector is used in member authentication and includes the d pieces of group identification vector elements. As all the members share the d pieces of group identification vector elements, all the member have the same authentication vector. The access control vector is used to control data access includes (d−1) pieces of group identification vector elements and one pieces of individual identification vector element. The authentication vector and the access control vector of a first member are respectively expressed as $$V_{Au} = \{v_{Gr\text{-}1}, v_{Gr\text{-}2}, \ldots, v_{Gr\text{-}d}\} \quad (2)$$

$$V_{Ac} = \{v_{Gr\text{-}1}, v_{Gr\text{-}2}, \ldots, v_{Gr\text{-}d\_1}, v_{Idv1}\} \quad (3)$$

In Step S12, generate public keys, which one public key element is derived from one vector element. For an arbitrary vector element $v_x$, the elements of the public key are generated via performing the ECC (Elliptic Curve Cryptography)-based multiplication operation on the group generator P and the random number $R_x$, which is mapping from the vector element $v_x$. $q_x$ is a group public key element or an individual public key element generated via performing calculation of group identification vector elements and the individual identification vector elements according to $q_x = f(v_x) = R_x \cdot P$, wherein $R_x$ is a random number. The group public key elements and the individual public key elements are used to form an authentication public key $PuK_{Au}$ and an access control public key $PuK_{Ac}$, which are respectively expressed as $$PuK_{Au} = \{f(v_{Gr\text{-}1}), f(v_{Gr\text{-}2}), \ldots, f(v_{Gr\text{-}d})\} = \quad (4)$$
$$\{q_{Gr\text{-}1}, q_{Gr\text{-}2}, \ldots, q_{Gr\text{-}d}\}$$

$$PuK_{Ac} = \{f(v_{Gr\text{-}1}), f(v_{Gr\text{-}2}), \ldots, \quad (5)$$
$$f(v_{Gr\text{-}d\_1}), f(v_{Idv1}), f(v_{Idv2}), \ldots, f(v_{Idvn})\}$$
$$= \{q_{Gr\text{-}1}, q_{Gr\text{-}2}, \ldots, q_{Gr\text{-}d\_1}, q_{Idv1}, q_{Idv2}, \ldots, q_{Idvn}\}$$

Therefore, the authentication public key $PuK_{Au}$ is composed of all the group public key elements, and the access control public key $PuK_{Ac}$ is composed of (d−1) pieces of group public key elements and the individual public key elements of all the n members. It should be noted that only the originator has the access control public key.

In Step S14, the originator generates a value y randomly, and generates an arbitrary (d−1)-degree polynomial $p(x) = a_0 + a_1 x + a_2 x^2 + \ldots + a_{d-1} x^{d-1}$ for each member, and let $p(0) = y$.

Next, the originator uses the polynomial and the identification vector to generate a unique private key $Prk^{Peer}$ for each member. The private key of a first member is expressed as $$Prk^{Peer1} = \{f'(v_{Gr-1}), f'(v_{Gr-2}), \ldots, f'(v_{Gr-d}), f'(v_{Idv1})\} \quad (6)$$

wherein $$f'(v_x) = \frac{p(v_x)}{R_x} \cdot P,$$

and wherein $R_x$ is a random number derived from the identification vector element $v_x$, and wherein P is a group generator.

Briefly, when establishing a dynamic group, a server or the originator assigns an identification vector $V^{Peer}$, a common authentication public key $PuK_{Au}$ and a private key $Prk^{Peer}$ to each member. However, the access control public key $PuK_{Ac}$ is not issued to any member. Only the originator possesses the access control public key $PuK_{Ac}$.

Suppose that a first member intends to authenticate a second member. The first member uses the authentication public key and a random number to encrypt an arbitrary message as an authentication message for checking whether the second member is a member of the group. If the second member decrypts the authentication message and transmits the decrypted authentication message to the first member, the first member confirms that the second member is a member of the same group.

During the encryption/decryption, only the originator randomly select a symmetric data encryption key then encrypt content with the symmetric data encryption key and encrypt said symmetric data encryption key with access control public key said reach the same aim as use access control public key to encrypt content directly.

Figure 2:
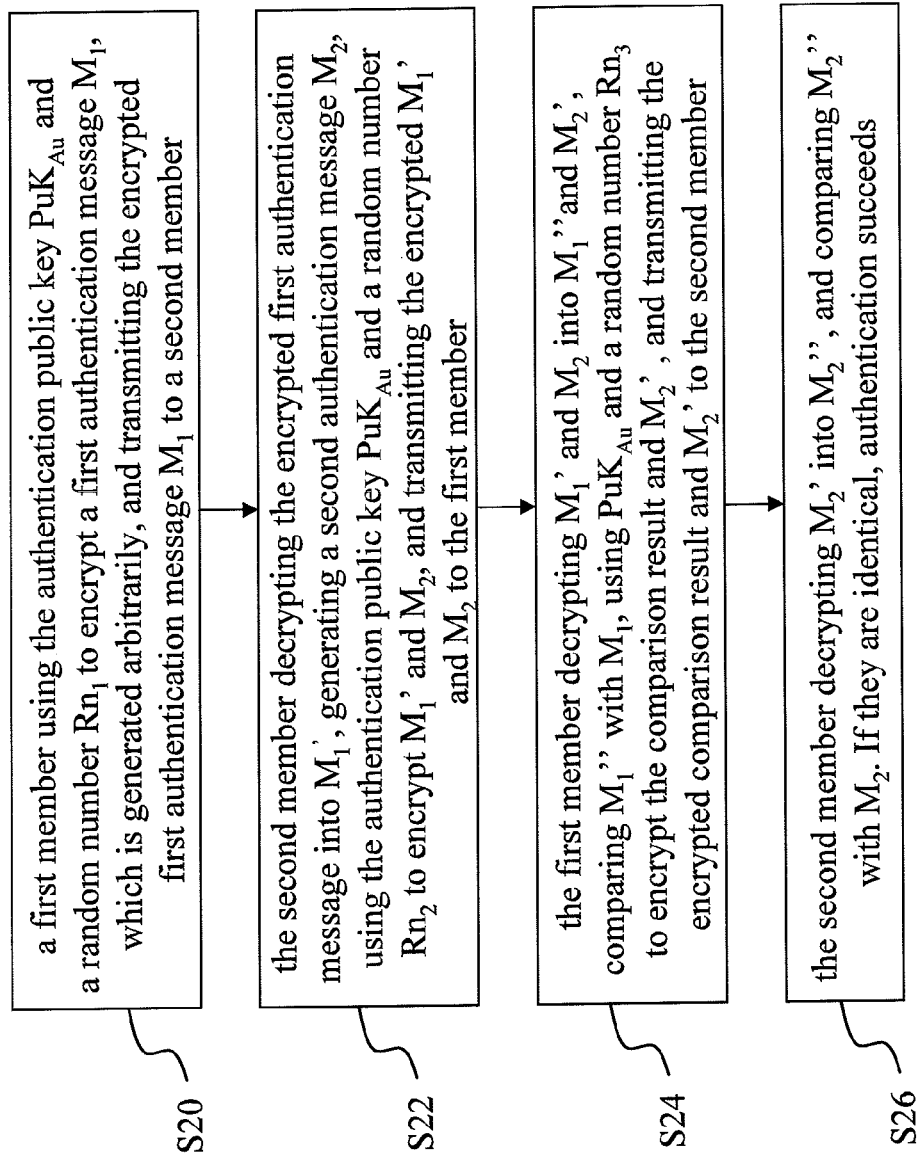
FIG. 2 shows a flowchart of a member authentication method for a dynamic group according to one embodiment of the present invention.

Refer to FIG. 2 showing a flowchart of a member authentication method according to one embodiment of the present invention. In Step S20, a first member uses the authentication public key $PuK_{Au}$ and a random number $Rn_1$ to encrypt a first authentication message $M_1$, which is generated arbitrarily, and transmits the encrypted first authentication message $M_1$ to a second member. In Step S22, the second member receives the encrypted first authentication message $M_1'$ and uses the authentication vector $v_{Au}{}^2$ and a second private key $PrK^2$ thereof to decrypt the encrypted first authentication message $M_1'$ to generate a once-decrypted first authentication message $M_1''$. Further, the second member generates a second authentication message $M_2$ and concatenates $M_1'$ and $M_2$ to form $M_1'\|M_2$. Next, the second member uses the authentication public key $PuK_{Au}$ and a random number $Rn_2$ to encrypt $M_1'\|M_2$ and transmits the encrypted $M_1'\|M_2$ to the first member. In Step S24, the first member uses the authentication vector $v_{Au}{}^1$ and his private key $PrK^1$ to decrypt the encrypted $M_1'\|M_2$ and obtain a twice-decrypted first authentication message $M_1''$ and a once-decrypted second authentication message $M_2'$. Next, the first member compares $M_1''$ with $M_1$ to determine whether $M_1''$ is identical to $M_1$. If they are identical, it means that the first member has successfully authenticated the second member. Next, the first member concatenates the comparison result Rslt and $M_2$ to form Rslt$\|M_2'$, uses $PuK_{Au}$ and a random number $Rn_3$ to encrypt Rslt$\|M_2'$ and transmits the encrypted Rslt$\|M_2'$ to the second member. In Step S26, the second member uses the authentication vector $v_{Au}{}^2$ and his second private key $PrK^2$ to decrypt the encrypted Rslt$\|M_2'$ and obtain a twice-decrypted second authentication message $M_2''$. Next, the second member compares $M_2''$ with $M_2$ to determine whether $M_2''$ is identical to $M_2$. If they are identical, it means that the second member has successfully authenticated the first member. If they are not identical, it means that authentication fails.

Briefly, an authenticator uses the authentication public key $PuK_{Au}$ to encrypt an authentication message, and the authenticatee uses his private key $Prk^{Peer}$ and the authentication vector $V_{Au}{}^{Peer}$ to decrypt the authentication message. Thereby, the members of the same group can authenticate each other.

Besides, the originator can use the access control public key $PuK_{Ac}$ to control the data accessibility of the members, whereby only the members can access data. Each member uses his own private key $Prk^{Peer}$ and access control vector $V_{Ac}{}^{Peer}$ to decrypt the encrypted data and verify whether the data comes from the originator.

Refer to FIG. 3 showing a flowchart of a communication security method according to one embodiment of the present invention. Suppose that the originator intends to send data to one member of the dynamic group having n members. In Step S30, the originator uses the access control public key $PuK_{Ac}$ to encrypt data and sends the encrypted data to the member. As mentioned above, the access control public key $PuK_{Ac}$ is composed of (d−1) pieces of group public key elements $q_{Gr-1}$, $q_{Gr-2}, \ldots, q_{Gr-d\_1}$ and individual public key elements $q_{Idv1}$, $q_{Idvn2}, \ldots$, of all the n members. In Step S32, after receiving the encrypted data, the receiver uses the access control vector $V_{Ac}{}^{Peer}$ and his own private key $Prk^{Peer}$ to decrypt the encrypted data. If the individual identification vector element $v_{Idv}$ of the individual access control vector $V_{Ac}{}^{Peer}$ of the receiver is one of the individual identification vector elements $v_{Idv1}, v_{Idv2}, \ldots, v_{Idvn}$, which the access control public key $PuK_{Ac}$ is based on, the process proceeds to Step S34. In Step S34 are confirmed that the data is encrypted by the originator and that the receiver is a member of the dynamic group. If the individual identification vector element $v_{Idv}$ of the individual access control vector $V_{Ac}{}^{Peer}$ of the receiver does not appear in the individual identification vector elements, which the access control public key $PuK_{Ac}$ is based on, the process proceeds to Step S36 where the receiver is determined to be not a member of the dynamic group. For example, the individual identification vector element of the individual access control vector $V_{Ac}{}^{Peer}$ of the receiver is $v_{Idv(n+1)}$, and the receiver $Peer_{n+1}$ fails to decrypt the encrypted data. Thus, $Peer_{n+1}$ is determined to be not a member of the dynamic group in Step S36.

For example, the originator invites $Peer_1, Peer_2, \ldots, Peer_n$ to join the group. When the originator uses the access control public key $PuK_{Ac}$ to encrypt data and intends to send the encrypted data to $Peer_2$, the originator adds the $Peer_2$ individual public key element $q_{Idv2}$, which is corresponding to the $Peer_2$ individual identification vector element $v_{Idv2}$, to the access control public key $PuK_{Ac}$. After receiving the encrypted data, $Peer_2$ can decrypt the encrypted data, merely using $V_{Ac}{}^2$ and $Prk^2$. The fact that $Peer_2$ decrypts the received data with $V_{Ac}{}^2$ and $Prk^2$ means that the received data is encrypted with the access control public key. As only the originator possesses the access control public key, $Peer_2$ confirms that the data comes from the originator.

As $Peer_{n+1}$ is not a member of the group, the originator would not add the individual public key element $q_{Idv(n+1)}$, which is corresponding to the individual identification vector element of $Peer_{n+1}$, to the access control public key $PuK_{Ac}$ when the originator uses the access control public key $PuK_{Ac}$ to encrypt data. As there is none public key element corresponding to $v_{Idv(n+1)}$ of $Peer_{n+1}$, $Peer_{n+1}$ does not have sufficient information to decrypt the encrypted data.

Therefore, the present invention has the following advantages: 1. Expandability: the originator can securely deliver information to all members, merely using a single piece of encrypted data. 2. Serverless member authentication: one member uses a common authentication public key to encrypt the authentication message, and another member uses his unique private key to decrypt the authentication message with none third party interposing therebetween. 3. Privacy: one member needn't know the actual identity of another member but only needs to confirm the membership thereof. 4. Exclusive decryptability: as the originator uses the access control public key, which is generated according to the individual identification vector elements of the members, to encrypt data, only the members can decrypt and access the data. 5. Data source authenticity: the receiver can verify whether data comes from the originator lest the data be altered. 6. Easy key administration: the originator only needs to keep an access control public key, and each member only needs to keep a common authentication public key and his own private key.

In conclusion, the present invention proposes a method for key generation, member authentication and communication security in a dynamic group. The present invention is applied to a one-to-many data sharing environment. In the present invention, data is encrypted with a common public key or a public key monopolized by the originator, and is decrypted by the private keys of all the qualified members. In the present invention, the members can authenticate each other with a common authentication public key and their private keys serverlessly without a third party interposing therebetween, whereby is protected the privacy of members. Further, the present invention provides a data access control mechanism. In the present invention, the originator encrypts data according to the individual identification vector elements of the members. Thus, only the members can decrypt the data. Besides, the members can use the access control vector used in decrypting data to check whether the data is issued by the originator or altered by someone.

The embodiments described above are only to exemplify the present invention but not to limit the scope of the present invention. Any equivalent modification or variation according to the characteristic or spirit of the present invention is to be also included within the scope of the present invention.

What is claimed is:

1. A member authentication method for a dynamic group, whereby a first member authenticates a second member, comprising Step (a): said first member encrypting a first authentication message into an encrypted first authentication message and sending said encrypted first authentication message to said second member;

Step (b): said second member decrypting said encrypted first authentication message into a once-decrypted first authentication message, generating a second authentication message, encrypting said once-decrypted first authentication message and said second authentication message into an encrypted once-decrypted first authentication message and an encrypted second authentication message, and sending said encrypted once-decrypted first authentication message and said encrypted second authentication message to said first member;

Step (c): said first member decrypting said encrypted once-decrypted first authentication message and said encrypted second authentication message into a twice-decrypted first authentication message and a once-decrypted second authentication message, and comparing said twice-decrypted first authentication message with said first authentication message, wherein if said twice-decrypted first authentication message is different from said first authentication message, authentication fails, and wherein if said twice-decrypted first authentication message is identical to said first verification message, execute Step (d);

Step (d): said first member encrypting a comparison result and said once-decrypted second authentication message into an encrypted comparison result and an encrypted once-decrypted second authentication message, and sending said encrypted comparison result and said encrypted once-decrypted second authentication message to said second member; and Step (e): said second member decrypting said encrypted comparison result and said encrypted once-decrypted second authentication message to obtain said comparison result and a twice-decrypted second authentication message, and comparing said twice-decrypted second authentication message with said second authentication message, wherein if said twice-decrypted second authentication message is different from said second authentication message, authentication fails, and wherein if said twice-decrypted second authentication message is identical to said second authentication message, authentication succeeds.

2. The member authentication method for a dynamic group according to claim 1, wherein in Step (a), said first authentication message is encrypted with a first random number and an authentication public key of said first member.

3. The member authentication method for a dynamic group according to claim 1, wherein in Step (b), said encrypted first authentication message is decrypted with a second authentication vector and a second private key of said second member to obtain said once-decrypted first authentication message.

4. The member authentication method for a dynamic group according to claim 1, wherein in Step (b), said once-decrypted first authentication message and said second authentication message are encrypted with a second random number and an authentication public key of said second member.

5. The member authentication method for a dynamic group according to claim 1, wherein in Step (c), said encrypted once-decrypted first authentication message and said encrypted second authentication message are decrypted with a first authentication vector and a first private key of said first member.

6. The member authentication method for a dynamic group according to claim 2, wherein in Step (d), said comparison result and said once-decrypted second authentication message are encrypted with a third random number and said authentication public key.

7. The member authentication method for a dynamic group according to claim 3, wherein in Step (e), said encrypted comparison result and said encrypted once-decrypted second authentication message are decrypted with said second authentication vector and said second private key.

* * * * *